United States Patent [19]

Morawski et al.

[11] 4,416,459
[45] Nov. 22, 1983

[54] COLLET CHUCK FOR SPLINED WORKPIECES

[76] Inventors: Longine V. Morawski, 1497 Boston Blvd./48206, Detroit; Lawrence V. Morawski, 38255 Fairway Ct., Apt. 82C/48044, Mt. Clemens, both of Mich.

[21] Appl. No.: 270,146

[22] Filed: Jun. 3, 1981

[51] Int. Cl.³ .............................................. B23B 5/22
[52] U.S. Cl. ............................... 279/2 R; 279/1 DC; 279/4; 82/44; 269/48
[58] Field of Search ................... 279/1 G, 1 L, 1 DC, 279/2 R, 2 AL, 51, 1 H, 4, 14, 16, 17, 46, 51, 52, 53, 1 DA, 44, 45, 41, 9 R, 35; 82/44; 269/48; 242/72.1

[56] References Cited

U.S. PATENT DOCUMENTS

| | | | |
|---|---|---|---|
| 2,806,705 | 9/1957 | Parker et al. | 279/2 |
| 2,852,263 | 9/1958 | Hohwart et al. | 279/2 |
| 2,877,022 | 3/1959 | Parker et al. | 279/2 |
| 3,179,428 | 4/1965 | Cull | 279/4 |
| 3,554,565 | 1/1971 | Cashman | 279/2 A |
| 3,701,539 | 10/1972 | Morawski et al. | 279/1 G |
| 3,759,535 | 9/1973 | Hilgers | 279/17 |
| 3,762,730 | 10/1973 | Camerom | 279/2 |
| 3,975,030 | 8/1976 | Akeel et al. | 279/1 DC |
| 4,121,847 | 10/1978 | Morawski | 242/72.1 |
| 4,149,682 | 4/1979 | Gustafson et al. | 242/72.1 |

*Primary Examiner*—E. R. Kazenske
*Assistant Examiner*—Hien H. Phan
*Attorney, Agent, or Firm*—Barnes, Kisselle, Raisch, Choate, Whittemore & Hulbert

[57] ABSTRACT

A chuck for splined workpieces includes at least two collets, the resilient fingers of which are circumferentially interdigitally related. The work-engaging surfaces of circumferentially adjacent fingers of the chuck are spaced apart a distance at least slightly greater than the circumferential extent of each radially facing splined surface on the workpiece, the arrangement being such that, when a splined workpiece is telescopically engaged with the collets, fingers of not more than one of the collets register with the radial surfaces of the splines so that the remaining collet fingers will grip the base diameter surface of the workpiece when the collets are actuated.

9 Claims, 5 Drawing Figures

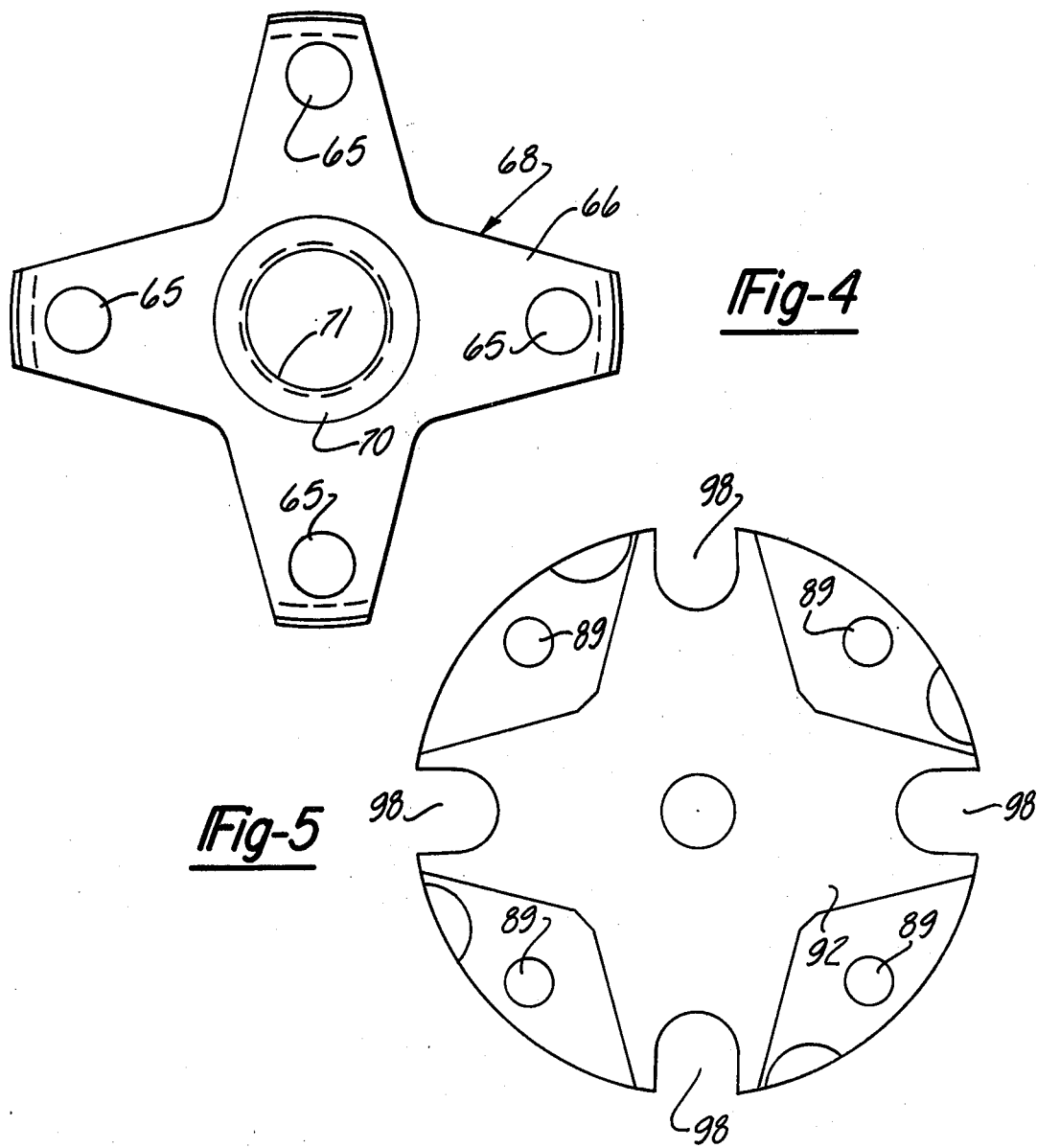

COLLET CHUCK FOR SPLINED WORKPIECES

This invention relates to a collet chuck and, more particularly, to a collet chuck designed for gripping internally or externally splined workpieces.

Many splined workpieces are, by necessity, gripped in collet chucks when machining operations are performed on them. A splined workpiece as used herein designates a workpiece having an annular surface from which a plurality of regularly circumferentially spaced narrow ribs project radially inwardly or radially outwardly. In many instances, especially in the case of thin walled splined workpieces, it is preferred to grip the workpiece at the base diameter of the workpiece between the splines, instead of directly on the radially facing surface of the splines, because the base diameter surface usually has a substantially greater circumferential extent than the circumferential extent of the radially facing splined surfaces. In the case of an externally splined workpiece the base diameter is the minor diameter of the workpiece and in the case of an internally splined workpiece the base diameter is the major diameter. When the workpiece has to be gripped on the base diameter it normally has to be circumferentially oriented to a particular position relative to the chuck so that the fingers of the collet will engage the desired surface on the workpiece when the collet is actuated. However, many machines are equipped with automatic workpiece loading devices that are not designed to rotate the workpiece to a particular circumferential orientation relative to the collet chuck. Thus, such workpiece loading devices cannot normally be used for loading splined workpieces on a conventional collet chuck.

The primary object of this invention is to provide a collet chuck on which splined workpieces can be loaded with random orientation of the splines relative to the fingers of the collet.

A more specific object of this invention is to provide a chuck which includes a plurality of collets which are arranged such that the fingers of at most one of the collets will register radially with the radially facing splined surfaces on the workpiece when the workpiece is telescopically engaged with the chuck regardless of the particular circumferential orientation of the splines on the workpiece relative to the collet fingers.

More specifically, the invention contemplates a chuck having a plurality of collets, each collet having a plurality of regularly circumferentially spaced fingers thereon. The circumferentially adjacent fingers of the collets are interdigitally disposed around a common circle. The adjacent fingers are spaced apart at their work-gripping surfaces a distance at least slightly greater than the circumferential extent of the radially facing surface of a spline on the workpiece so that, when the workpiece is telescopically engaged with the chuck, fingers of only one of the collets can at most be radially aligned with the radially facing spline surfaces on the workpiece. Both collets are actuated after the chuck is loaded with a workpiece. However, if the fingers of one of the collets engage the radially facing spline surfaces on the workpiece, then said one collet is released so that the only collet or collets which remain operative to grip the workpiece are those collets all the fingers of which register radially with the base diameter surface of the workpiece.

Other objects, features and advantages of the present invention will become apparent from the following description and accompanying drawings, in which:

FIG. 4 is a rear elevational view of one of the collet pullers; and

FIG. 5 is a rear elevational view of the other collet puller.

Figure 1:
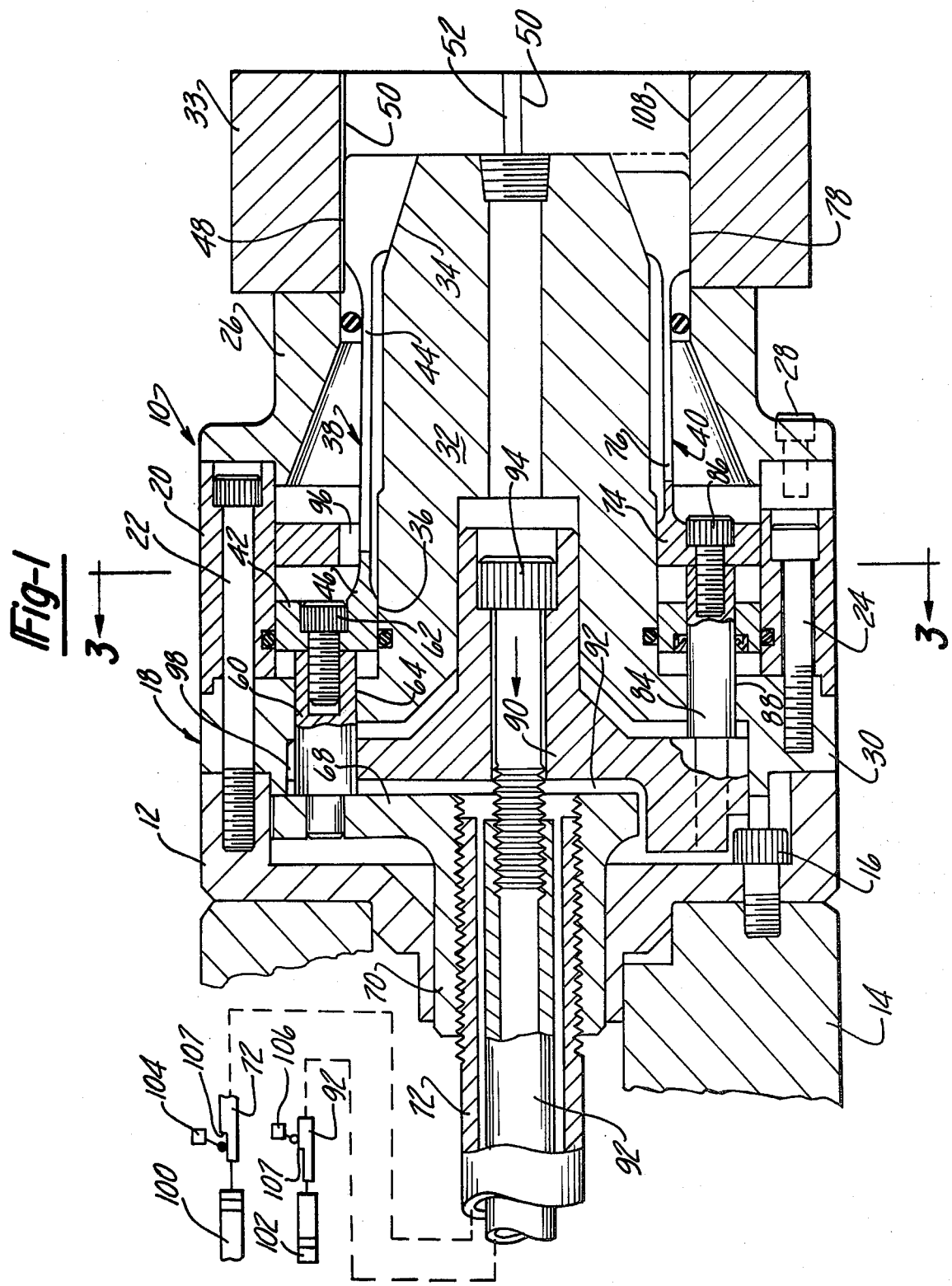
FIG. 1 is a longitudinal sectional view of a collet chuck according to the present invention taken along the line 1—1 in FIG. 3 and showing the chuck in the work-gripping position.

The chuck shown in FIG. 1 comprises a main body portion, generally designated 10, which includes an adaptor 12 adapted to be mounted on the spindle 14 of a machine tool by means of screws 16. A collet expander 18 and a spacer ring 20 are secured to adaptor 12 by screws 22. Additional screws 24 are employed for securing spacer ring 20 to expander 18. The front end of the chuck body 10 comprises an annular part stop 26 secured to spacer ring 20 by screws 28.

The collet expander 18 has an outer circumferentially continuous flange 30 and a reduced diameter, forwardly extending nose 32. The chuck illustrated is one for engaging an internally splined workpiece 33. Thus, the nose 32 is formed with a conical portion 34 at its forward end and a cylindrical portion 36 axially adjacent the outer flange 30. Within the chuck body between the nose 32 and the spacer ring 20 there are arranged two collets, generally designated 38 and 40. Collet 38 has at its rear end an outer peripheral flange 42, the inner periphery of which has a close sliding fit with the cylindrical portion 36 of nose 32. The outer periphery of flange 42 has a close sliding fit with the inner periphery of spacer ring 20. A plurality of radially resilient collet fingers 44 extend forwardly from and are integrally connected with flange 42 as at 46. The inner periphery of the forward ends of fingers 44 are conically tapered to interfit with the conical surface 34 of nose 32. The radially outer surfaces of the forward ends of fingers 44 form cylindrically shaped work-gripping surfaces 48.

Figure 2:
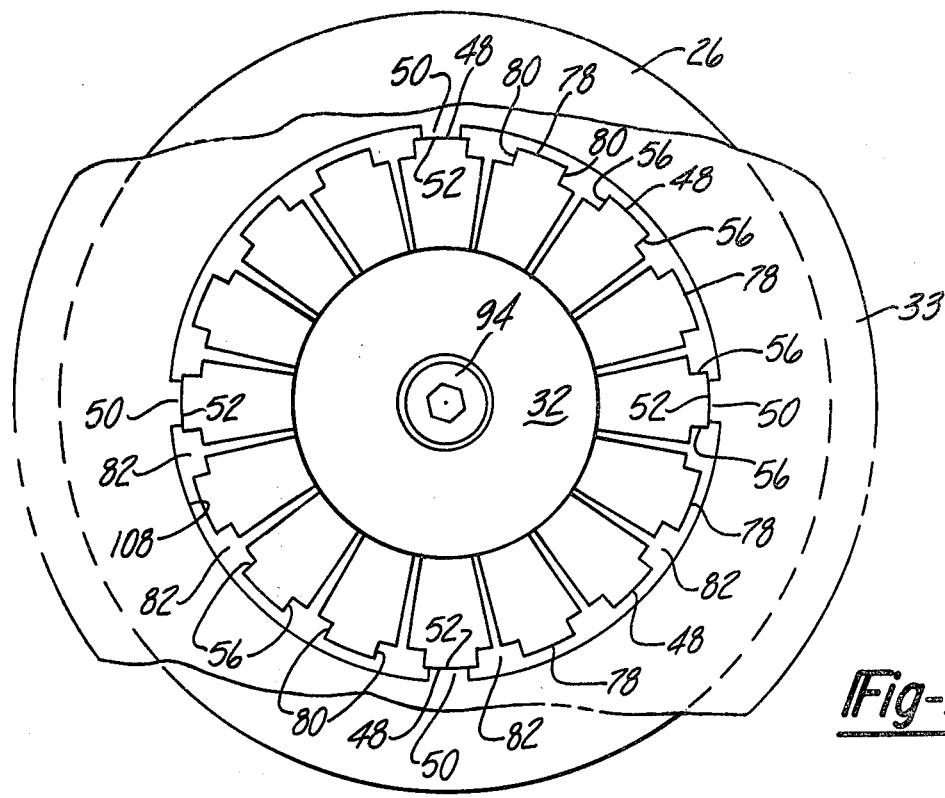
FIG. 2 is a front end view of the collet shown in FIG. 1, the workpiece being shown fragmentally.
Figure 3:
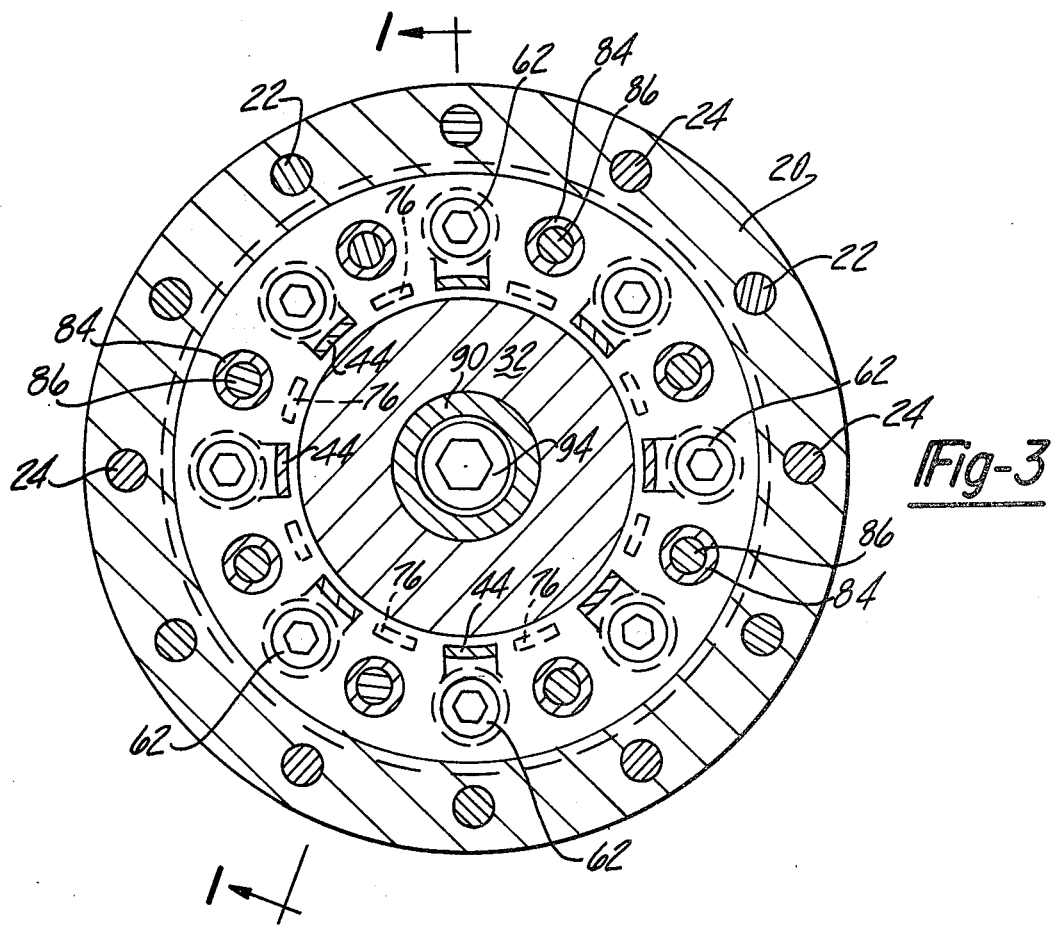
FIG. 3 is a sectional view taken along the line 3—3 in FIG. 1 and showing the collets in the released position.

Referring to FIG. 2 it will be observed that the workpiece 33 has four equally spaced, radially inwardly projecting splines 50. In FIG. 1 the radially inwardly facing surfaces of splines 50 are designated 52 and the major diameter surface of the workpiece is designated 108. From FIG. 2 it will be noted that at each side of the work-gripping surface 48 the front end portion of finger 44 is notched, as at 56.

Referring again to FIG. 1, the flange 42 of collet 38 is rigidly secured to a plurality of pins 60 by screws 62. Pins 60 extend rearwardly through openings 64 in the flange 30 of expander 18 and are brazed or otherwise rigidly secured within openings 65 in radially extending arms 66 of a collet puller 68. As shown in FIG. 4, collet puller 68 is of generally cruciform shape and has a rearwardly extending central hub 70 provided with a threaded bore 71 for connection with a tubular drawbar 72 associated with spindle 14 of the machine tool.

The other collet 40 has generally the same configuration as the collet 38 described. Collet 40 has a rear flange 74, a plurality of circumferentially spaced fingers 76, the forward ends of which are internally tapered to interfit with conical surface 34 of the nose 32, and the external surface of which is formed with work-gripping surfaces 78 which, as shown in FIG. 2, are defined by notches 80 at each side of the finger. In the arrangement illustrated each collet has eight work-gripping fingers. The outer diameter of the workgripping surfaces 78 on fingers 76 is the same as the outer diameter of the work-gripping surfaces 48 on fingers 44. It will also be observed from FIG. 2 that the spaces 82 between the adjacent work-gripping surfaces 48,78 have a circumferential extent greater than the circumferential extent of the surfaces 52 of splines 50. This is an important feature of the present invention.

Referring again to FIG. 1, the flange 74 of collet 40 is connected to pins 84 by screws 86. Pins 84 also extend through openings 88 in the flange 30 of expander 18 and are rigidly secured in openings 89 in a second collet puller 90. Collet puller 90 is connected to a second drawbar 92 by means of a screw 94. Drawbar 92 is arranged concentrically within drawbar 72. It will be observed that flange 42 of collet 38 is located rearwardly of flange 74 of collet 40. Thus, flange 74 is provided with a plurality of circumferentially spaced notches 96 (FIG. 1) around its inner periphery to accommodate the fingers 44 of collet 38 and flange 42 is provided with a plurality of openings to slidably accommodate puller pins 84. It will also be observed that collet puller 68 is located rearwardly of collet puller 90. The rear face of collet puller 90 is provided with a recess 92 to receive puller 68 in nested relation. Around its outer periphery puller 90 is provided with four equally spaced notches 98 to accommodate the puller pins 60 for collet 38.

The two drawbars 72,92 can be operated by any suitable means. In the arrangement illustrated a hydraulic cylinder 100 is employed to reciprocate drawbar 72 and a similar hydraulic cylinder 102 is employed to reciprocate drawbar 92. Any suitable means may be employed for detecting the extent of retraction of the two drawbars. In the arrangement illustrated these means are illustrated as microswitches 104,106. The microswitches are actuated by shoulders 107 on the drawbars when the associated drawbar is fully retracted, thus indicating that the workpiece has been properly gripped by the collet fingers. When either of the cylinders 100,102 are actuated and the associated microswitch is not tripped, this is an indication that the associated drawbar has not been fully retracted and the corresponding cylinder will accordingly move forward to its starting position and thus collapse the fingers of the associated collet.

In operation, a workpiece 33 with the radially inwardly projecting splines 50 is telescopically arranged over the ends of the two sets of collet fingers 44,76 with the splines 50 randomly oriented relative to the fingers of the two collets. Since, as pointed out previously, the spaces 82 between the adjacent work-engaging surfaces 48,78 of the two sets of collet fingers has a greater circumferential extent than the radially facing surfaces 52 of splines 50, it follows that the work-engaging surfaces of several fingers of at most one of the collets will register radially with splines 50. In the arrangement shown in FIG. 2 the work-engaging faces 48 of four fingers 44 spaced 90° apart register radially with the splines 50. The work-engaging faces of the remaining fingers of both sets register radially with the major diameter surface 108 of the workpiece which extends circumferentially between the successive splines 50. Therefore, when the two cylinders 100,102 are actuated to retract the drawbars 72,92 collet 40 will be fully retracted. Microswitch 106 will be tripped so that the work-engaging surfaces 78 of its fingers 76 will remain in gripping engagement with the workpiece at the major diameter surface 108 thereof. However, upon retraction of collet 38 the work-engaging surfaces 48 of four of its fingers will immediately contact the spline faces 52 and prevent further retraction of collet 38. Thus, the microswitch 104 associated with drawbar 72 will not be tripped within the required time interval so that the piston of cylinder 104 will be advanced and thus release the fingers of collet 38. The two collets will therefore assume the condition shown in FIG. 1.

In the arrangement illustrated, since the workpiece 33 has four equally spaced splines 50, two collets, each provided with eight circumferentially spaced fingers, will ensure that only four of the fingers of only one of the collets will at most register radially with the spline faces 52. If, by chance, the workpiece were telescoped over the collet fingers with the splines 50 registering fully with the spaces 82 between adjacent collet fingers, the workpiece would then be gripped at its base diameter surface by all of the fingers of both collets. If the workpiece had six splines, then two collets, each provided with three or six fingers would be employed. Likewise, if the workpiece had three or nine equally spaced splines instead of two, then the chuck would employ three collets instead of two. In any event, the spacing between the work-engaging surfaces of adjacent fingers must at all times have a greater circumferential extent than the radially facing spline surfaces and the number of collets employed in the chuck will depend upon the number of splines on the workpiece.

We claim:

1. In combination, a chuck and a workpiece having a base diameter surface interrupted at regularly circumferentially spaced intervals by axially extending, radially projecting splines having radially facing surfaces, said chuck having a body, at least two collets supported on said body, each collet having a plurality of regularly circumferentially spaced fingers which extend axially forwardly on the chuck body and are radially resilient at their forward ends, each of said fingers having radially facing work-engaging surfaces at their forward ends, the fingers of the collets being interdigitally disposed circumferentially at their forward ends around a common circle so that the circumferentially adjacent work-engaging surfaces are associated with different collets, the circumferentially adjacent work-engaging surfaces being spaced apart circumferentially a distance at least slightly greater than the circumferential extent of the radially facing surface of each spline on the workpiece and the number of collets being related to the number of splines on the workpiece so that, when a workpiece is telescopically engaged with the collet fingers, the work-engaging surfaces of at most one of the collets will register radially with the radially facing surfaces of the splines and operating means for shifting each of the collets to the work-engaging and work-releasing positions, said means being operative to shift one collet to the work-releasing position in the event that the work-engaging surfaces thereof are not displaced radially a distance sufficient to engage the base diameter surface of the splined workpiece when the collet is shifted to the work-engaging position.

2. The combination called for in claim 1 wherein said operating means are adapted to shift said fingers axially in opposite directions to the work-engaging and work-releasing positions.

3. The combination called for in claim 2 wherein the work-engaging surfaces on the fingers face radially outward, said body having a central, finger-expanding nose portion around which the fingers are arranged.

4. The combination called for in claim 1 wherein the fingers of the collets are interdigitally related throughout substantially the entire length thereof.

5. The combination called for in claim 4 wherein the forward ends of the work-engaging surfaces of all of the fingers terminate in generally the same radial plane, the rear ends of the fingers of each collet being integral with a circumferentially continuous flange on the respective collet, axially extending stud means connecting each flange with a puller plate, each of said puller platess being connected to an axially reciprocable drawbar for shifting the fingers to the work-engaging and work-releasing positions.

6. The combination called for in claim 5 wherein the rear ends of the fingers of one collet terminate forwardly of the rear ends of the fingers of the other collet, the fingers of said other collet extending forwardly through the flange of said one collet.

7. The combination called for in claim 6 wherein said puller plates are spaced apart axially, the stud means associated with one of said collets extending through the puller plate of the other collet.

8. The combination called for in claim 4 wherein said operating means are adapted to shift the collets to work-engaging position simultaneously.

9. The combination called for in claim 8 wherein said operating means are adapted to shift said one collet to the released position after a predetermined time interval.

* * * * *